(12) United States Patent
Wang et al.

(10) Patent No.: US 10,317,619 B2
(45) Date of Patent: Jun. 11, 2019

(54) HIGH-BANDWIDTH BEND-INSENSITIVE MULTIMODE OPTICAL FIBER

(71) Applicant: YANGTZE OPTICAL FIBRE AND CABLE JOINT STOCK LIMITED COMPANY, Wuhan, Hubei (CN)

(72) Inventors: Runhan Wang, Hubei (CN); Rong Huang, Hubei (CN); Haiying Wang, Hubei (CN); Ruichun Wang, Hubei (CN); Shengya Long, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 15/781,564

(22) PCT Filed: Oct. 9, 2016

(86) PCT No.: PCT/CN2016/101549
§ 371 (c)(1),
(2) Date: Jun. 5, 2018

(87) PCT Pub. No.: WO2017/101568
PCT Pub. Date: Jun. 22, 2017

(65) Prior Publication Data
US 2018/0372946 A1 Dec. 27, 2018

(30) Foreign Application Priority Data
Dec. 17, 2015 (CN) .......................... 2015 1 0953175

(51) Int. Cl.
*G02B 6/02* (2006.01)
*G02B 6/028* (2006.01)
(Continued)

(52) U.S. Cl.
CPC ....... *G02B 6/0288* (2013.01); *G02B 6/02009* (2013.01); *G02B 6/0281* (2013.01);
(Continued)

(58) Field of Classification Search
None
See application file for complete search history.

(56) References Cited

U.S. PATENT DOCUMENTS 7,336,877 B2   2/2008 Bickham
2003/0223717 A1  12/2003 Blaszyk et al.
(Continued)

FOREIGN PATENT DOCUMENTS

CN   102621627 A   8/2012
CN   104391351 A   3/2015
(Continued)

OTHER PUBLICATIONS

International Search Report (ISR) issued by the State Intellectual Property Office of the Peoples Republic of China dated Jan. 18, 2017 for PCT/CN2016/101549, China.

*Primary Examiner* — Jerry Rahll
(74) *Attorney, Agent, or Firm* — Tim Tingkang Xia, Esq.; Locke Lord LLP

(57) ABSTRACT

A high-bandwidth bend-insensitive multimode optical fiber includes a core and a cladding. A refractive index profile of the core has a parabola shape and a distribution index thereof is α. The core has a radius of 23-27 µm. A maximum relative refractive index difference of a central position of the core is 0.9%-1.2%. The core is a germanium-fluorine co-doped silicon dioxide glass layer. The central position of the core has a minimum amount of fluorine doped, and a mass percentage of fluorine content is $C_{F,min}$. A mass percentage of fluorine content of the core changes with the radius according to a function. The cladding successively comprises an inner cladding, a trench cladding, and an outer cladding from inside to outside. The optical fiber reduces bandwidth-wavelength sensitivity while improving bandwidth performance; is compatible with existing OM3/OM4 multimode optical fibers, and support wavelength-division multiplexing technology in a wavelength range of 850-950 nm.

8 Claims, 4 Drawing Sheets

(51) Int. Cl.
*G02B 6/036* (2006.01)
*H04J 14/02* (2006.01)
(52) U.S. Cl.
CPC ......... *G02B 6/02085* (2013.01); *G02B 6/036* (2013.01); *G02B 6/03638* (2013.01); *G02B 6/021* (2013.01); *G02B 6/028* (2013.01); *G02B 6/02071* (2013.01); *H04J 14/0278* (2013.01)

(56) References Cited

U.S. PATENT DOCUMENTS

2010/0254653 A1   10/2010  Molin et al.
2016/0291246 A1* 10/2016  Shiozaki ............... C03C 13/046

FOREIGN PATENT DOCUMENTS

| CN | 104698535 A | 6/2015 |
|----|-------------|--------|
| CN | 105334569 A | 2/2016 |

* cited by examiner

HIGH-BANDWIDTH BEND-INSENSITIVE MULTIMODE OPTICAL FIBER

CROSS-REFERENCE TO RELATED APPLICATIONS

This application is a U.S. national stage application of PCT Patent Application Serial No. PCT/CN2016/101549, filed Oct. 9, 2016, which itself claims priority to Chinese Patent Application No. 201510953175.9, filed Dec. 17, 2015 in the State Intellectual Property Office of P.R. China, which are hereby incorporated herein in their entireties by reference.

FIELD OF THE INVENTION

The present disclosure relates to a high-bandwidth bend-insensitive multimode optical fiber, and belongs to the technical field of optical communication.

BACKGROUND OF THE INVENTION

According to the description on multimode optical fibers in IEC (International Electrotechnical Commission) standard IEC 60793-2 for optical fiber products, A1 optical fibers are multimode optical fibers and can be further classified into A1a optical fibers, A1b optical fibers, and A1d optical fibers according to different geometric structures. A1a optical fibers are graded-index optical fibers of 50/125 μm, A1b optical fibers are graded-index optical fibers of 62.5/125 μm, and A1d optical fibers are graded-index optical fibers of 100/140 μm. A1a optical fibers are the most widely-used commercial multimode optical fibers among the three types of optical fibers, and can be further classified into A1a.1 optical fibers, A1a.2 optical fibers, and A1a.3 optical fibers with bandwidth performance in ascending order, which respectively correspond to OM2 cabled optical fibers, OM3 cabled optical fibers, and OM4 cabled optical fibers in the ISO/IEC standard.

With the advantage of a low system cost, multimode optical fibers have become a superior solution in short-distance high-speed transmission networks and have been widely applied in data center, business center, high-performance computing center, storage area network, etc. Application scenarios of multimode optical fibers are usually integration systems like a narrow cabinet, a wire distribution box, etc., and the optical fibers will have a very small bending radius. While conventional multimode optical fibers are undergoing a small-angle bending, high-order modes transmitting near the edge of the fiber core leak out easily, which will result in signal loss. While designing a refractive index profile of a bend-insensitive multimode optical fiber, leakage of high-order modes can be prevented by way of adding a low refractive-index area in the cladding of the optical fiber, so as to minimize the signal loss. The excellent bend-insensitive property of bend-insensitive multimode optical fibers enables them to be efficiently applied in the local area network of a data center.

Inter-modal dispersion existed in multimode optical fibers greatly limits the transmission distance thereof. In order to reduce inter-modal dispersion in optical fibers, the refractive index profile of a core of a multimode optical fiber needs to be designed to have a refractive index continuously and gradually decreasing from the center to the edge. Said profile is usually called "α profile". In other words, said profile needs to satisfy the refractive index distribution of the following power-exponential function:

$$n^2(r) = n_1^2 \left[ 1 - 2\Delta_0 \left(\frac{r}{a}\right)^\alpha \right] \quad r < a$$

wherein $n_1$ stands for refractive index of an optical fiber axis, r stands for distance away from an axis, a stands for radius of an optical fiber core, α stands for distribution index, and $\Delta_0$ stands for refractive index of a fiber core center relative to a cladding.

The relative refractive index is represented by $\Delta_i$:

$$\Delta_i \% = \left[ \frac{(n_i^2 - n_0^2)}{2n_i^2} \right] \times 100\%$$

wherein $n_i$ stands for refractive index of a position i away from a fiber core center, and $n_0$ stands for minimum refractive index of a core of an optical fiber, which is normally refractive index of a cladding of an optical fiber.

Doping agents with a refractive index adjustment function and at a certain concentration (such as $GeO_2$, F, $B_2O_3$, $P_2O_5$, $TiO_2$, $Al_2O_3$, $ZrO_2$, $SnO_2$, etc.) are doped in $SiO_2$ to realize refractive index distribution of a core of a multimode optical fiber, and multimode optical fibers designed thereby can support a high-speed transmission of hundreds of meters. For example, with a laser light source of 850 nm, a single OM4 multimode optical fiber can support a more-than-550 m transmission of Ethernet traffic at a speed of 10 Gb/s and a more-than-150 m transmission thereof at a speed of 40 Gb/s. However, with the rapid development of the network transmission speed and users' increasing demands for bandwidth, capacity of multimode optical fibers needs to be continuously increased. At present, bandwidth of a single OM4 multimode optical fiber has come near the upper limit of a multimode optical fiber. In a single-light-source transmission system with a speed of 100 Gb/s, 400 Gb/s, or an even higher speed, the transmission distance that can be supported by the OM4 multimode optical fiber is greatly reduced. Wavelength division multiplexing (WDM) technology is an effective means that can further increase capacity of multimode optical fibers so that the multimode optical fibers can be better adapted to a higher-speed transmission system. With the WDM technology, a single optical fiber can accommodate multiple data channels, and each increase of one wavelength can enhance transmission capacity of optical fibers. For example, four wavelengths of 25 Gb/s are integrated to be transmitted by one multimode optical fiber, which realizes a property of a single multimode optical fiber to support a more-than-150 m transmission at a speed of 100 Gb/s, i.e., capacity of a single multimode optical fiber is increased to four times of the original transmission capacity. Application of the WDM technology in a multimode optical fiber requires the optical fiber to be able to support high-performance transmission under multiple wavelength windows.

Multimode optical fibers can obtain high bandwidth performance by way of precisely controlling refractive index distribution of a core. The bandwidth performance here refers to overfilled-launch (OFL) bandwidth of optical fibers, measured by the measurement test defined by the FOTP-204 standard prescribed in TIA. It is shown by research that, when a refractive index profile of multimode optical fibers is fixed, multimode optical fibers usually show high bandwidth performance only at a specific wavelength window, and when the optical fiber application window moves to a longer or a shorter wavelength, the bandwidth performance will get worse obviously. The relation between bandwidth of conventional OM3/OM4 multimode optical fibers and wavelength thereof is shown in FIG. 1, and as can be seen, the bandwidth performance sharply worsens outside the window of 850 nm. Obviously, said multimode optical fibers can hardly satisfy the requirement for application of the WDM technology.

U.S. Pat. No. 7,336,877 discloses an optical fiber having a core with a multi-segmented refractive index distribution which can support 2 GHz-km data transmission of one or more wavelength windows in a waveband between 775 nm and 1100 nm. However, said optical fiber fails to meet the standards for OM4 optical fibers, is unable to be compatible with conventional multimode optical fibers, and does not possess bend-insensitive properties. US Patent No. 2010254653 discloses a multimode optical fiber having anaprofile, and bandwidth performance of the optical fiber at windows of 850 nm and 1300 nm is optimized by way of Ge—F co-doping. However, said multimode optical fiber cannot satisfy the requirement for application of the WDM technology and does not possess bend-insensitive properties.

Therefore, it is necessary to design a multimode optical fiber which can not only be compatible with existing OM3/OM4 multimode optical fibers, but also have low bandwidth-wavelength sensitivity, can satisfy the requirements for application of the WDM technology in a certain waveband range, and possess excellent bend-insensitive properties, so as to satisfy the market demand for an increasing capacity of multimode optical fibers.

SUMMARY OF THE INVENTION

The technical problem to be solved by the present disclosure is to provide a high-bandwidth bend-insensitive multimode optical fiber with a reasonable structure design and low bandwidth-wavelength sensitivity to eliminate the above deficiencies existing in the prior art.

In order to solve the above technical problem, the present disclosure provides the following technical solution. The high-bandwidth bend-insensitive multimode optical fiber comprises a core and a cladding. A refractive index profile of the core has a parabola shape and a distribution index thereof is α. The core has a radius R1 of 23 to 27 μm, a maximum relative refractive index difference $\Delta1_{max}$ of a central position of the core is 0.9% to 1.2%, and the core is a germanium (Ge)-fluorine (F) co-doped silicon dioxide glass layer. The central position of the core has a minimum amount of F doped, a mass percentage of F content is $C_{F,min}$, and a mass percentage of F content of the core changes with the radius according to a following function:

$$C_F(r) = C_{F,min} + C_F' \times \frac{r}{R1} \times \left(k - \frac{r}{R1}\right),$$

k is a constant in a range from 1 to 2.5, and $C_F'$ is in a range from $3\times10^{-3}$ to $12\times10^{-3}$. The cladding successively comprises an inner cladding, a trench cladding, and an outer cladding from inside to outside.

According to the above solution, the mass percentage $C_{F,min}$ of F content of the central position of the core is smaller than or equal to $1\times10^{-3}$.

According to the above solution, the distribution index α of the refractive index profile of the core is from 1.9 to 2.2.

According to the above solution, the inner cladding has a single side width (R2−R1) of 3.0 to 6.0 μm and a relative refractive index difference Δ2 of −0.05% to 0.05%; the trench cladding has a single side width (R3−R2) of 5.0 to 8.0 μm and a relative refractive index difference Δ3 of −1.0% to −0.4%; and the outer cladding is a pure silicon dioxide glass layer.

According to the above solution, differential mode delay (DMD) of the optical fiber at a wavelength of 850 nm meets following standards: DMD Inner Mask (5 to 18 μm) and DMD Outer Mask (0 to 23 μm) are both smaller than or equal to 0.14 ps/m; and DMD Interval Mask is smaller than or equal to 0.11 ps/m.

According to the above solution, the optical fiber has a numerical aperture of 0.185 to 0.215.

According to the above solution, the optical fiber has a bandwidth equal to or larger than 3500 MHz-km at a wavelength of 850 nm, has a bandwidth equal to or larger than 2300 MHz-km at a wavelength of 950 nm, and has a bandwidth equal to or larger than 500 MHz-km at a wavelength of 1300 nm.

Further, the optical fiber has a bandwidth equal to or larger than 5000 MHz-km at a wavelength of 850 nm, has a bandwidth equal to or larger than 3300 MHz-km at a wavelength of 950 nm, and has a bandwidth equal to or larger than 600 MHz-km at a wavelength of 1300 nm.

According to the above solution, the optical fiber has an effective-mode bandwidth (EMB) equal to or larger than 4700 MHz-km at a wavelength of 850 nm.

According to the above solution, the optical fiber has an effective-mode bandwidth (EMB) equal to or larger than 3400 MHz-km at a wavelength of 875 nm.

According to the above solution, the optical fiber has an effective-mode bandwidth (EMB) equal to or larger than 2900 MHz-km at a wavelength of 900 nm.

According to the above solution, the optical fiber has an effective-mode bandwidth (EMB) equal to or larger than 2800 MHz-km at a wavelength of 925 nm.

According to the above solution, the optical fiber has an effective-mode bandwidth (EMB) equal to or larger than 2500 MHz-km at a wavelength of 950 nm.

According to the above solution, when the optical fiber bends 2 circles with a bending radius of 7.5 mm at a wavelength of 850 nm, an additional bending loss caused thereby is smaller than 0.2 dB, and can even reach 0.02 dB; and when the optical fiber bends 2 circles with a bending radius of 7.5 mm at a wavelength of 1300 nm, an additional bending loss caused thereby is smaller than 0.5 dB, and can even reach 0.1 dB.

The present disclosure achieves the following beneficial effects. 1. The optical fiber of the present disclosure, by way of optimizing the doping amount of F in the core, realizes optimization of optical transmission bandwidth performance, and reduces bandwidth-wavelength sensitivity while improving bandwidth performance. 2. The optical fiber of the present disclosure can not only be compatible with existing OM3/OM4 multimode optical fibers, but also support the WDM technology in a wavelength range of 850 to 950 nm. 3. The optical fiber of the present disclosure has excellent bend-insensitive properties and can be applied in access network and mini-sized optical devices. The present disclosure further increases transmission capacity of multimode optical fibers, is adapted to the network requirement under a rapid increase of data traffic, and is of great significance in application of the optical communication technology.

DETAILED DESCRIPTION OF THE EMBODIMENTS

The present disclosure will be further explained with reference to the following detailed embodiments.

Embodiment 1

Figure 1:
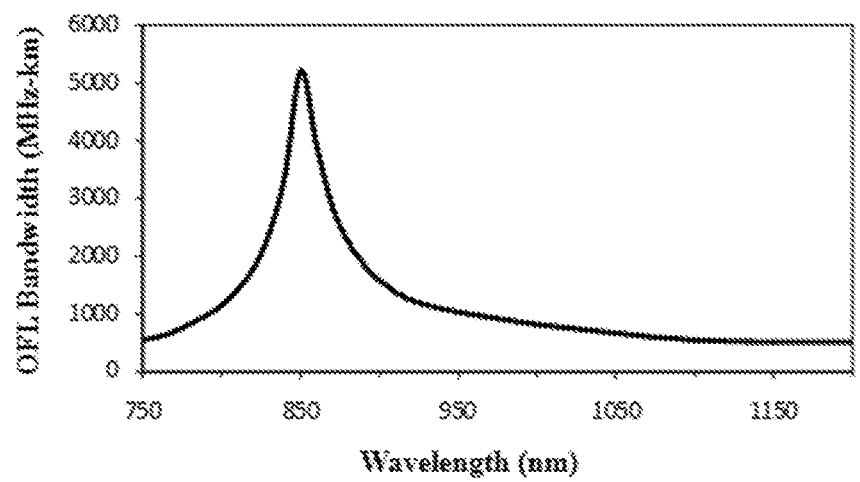
FIG. 1 schematically shows a relation between bandwidth of conventional OM3/OM4 multimode optical fibers and wavelength thereof.
Figure 2:
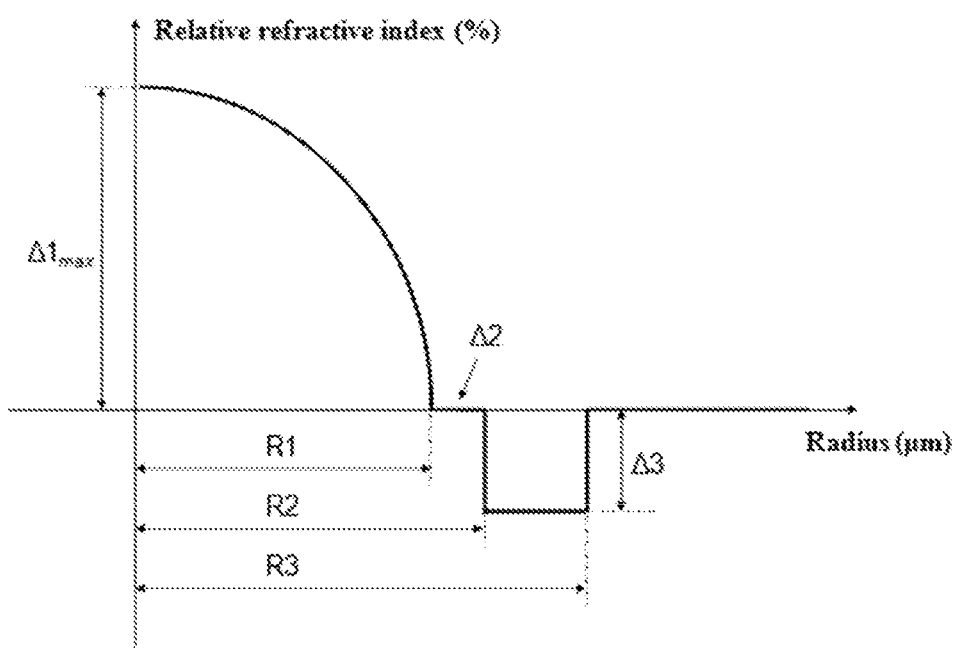
FIG. 2 schematically shows a refractive index profile of an optical fiber of the present disclosure.
Figure 3:
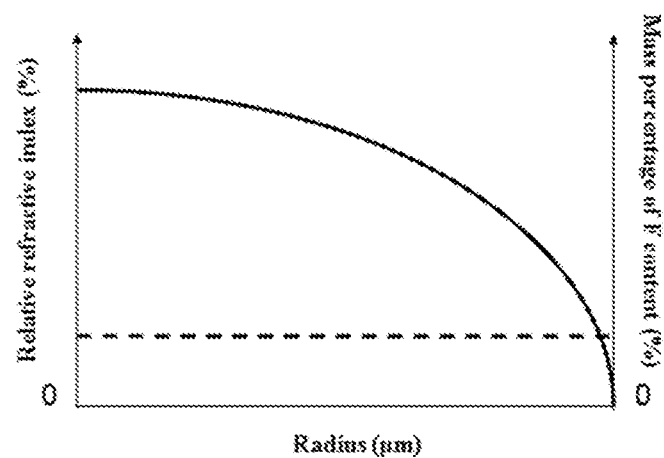
FIG. 3 schematically shows a refractive index profile of a core of an optical fiber in Embodiment 1 and a doping amount of F in the core, which is a comparative embodiment of the present disclosure.
Figure 4:
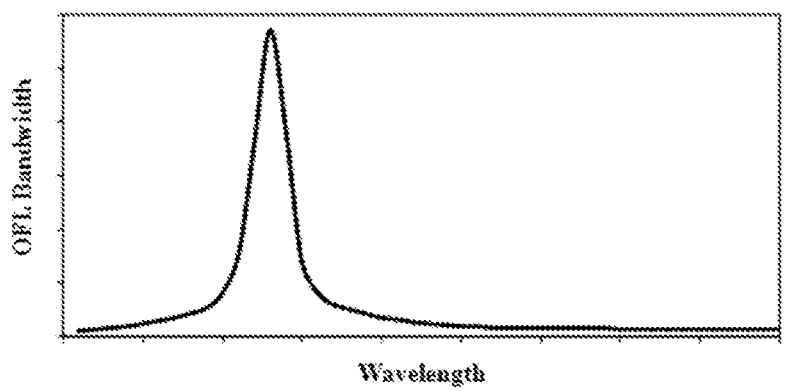
FIG. 4 schematically shows a relation between bandwidth of the optical fiber in Embodiment 1 and wavelength thereof.

The optical fiber comprises a core and a cladding. A refractive index profile of the core has a parabola shape and a distribution index a thereof is 2.01. The core has a radius R1 of 25.3 μm, and a maximum relative refractive index difference $\Delta 1_{max}$ of a central position of the core is 0.98%. The core is Ge—F co-doped. A mass percentage $C_F$ of F content of the core distributed along the radius is a fixed value $3\times 10^{-3}$. The cladding successively comprises an inner cladding, a trench cladding, and an outer cladding from inside to outside. The inner cladding has a radius R2 of 29.7 μm and a relative refractive index difference Δ2 of −0.02%. The trench cladding has a radius R3 of 35.9 μm and a relative refractive index difference Δ3 of −0.55%. Measurement results of structure and properties of the obtained optical fiber are shown in Table 1. FIG. 3 schematically shows a refractive index profile of the optical fiber and a doping amount of F in the core. The doping amount of F remains unchanged from the center of the core of the optical fiber to the edge thereof. FIG. 4 schematically shows a relation between bandwidth of the optical fiber and wavelength thereof. The optical fiber can satisfy high bandwidth performance transmission at a conventional window of 850 nm. However, the bandwidth of the optical fiber has a high sensitivity of changing as the wavelength changes, and sharply decreases at a window of 950 nm, which fails to satisfy the requirement for application of the WDM technology in a wavelength range of 850 to 950 nm.

Embodiment 2

A multimode optical fiber manufactured according to the technical solution of the present disclosure.

Figure 5:
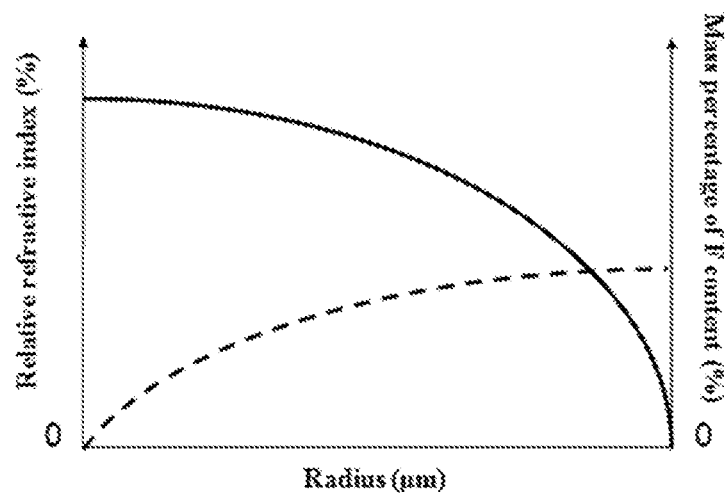
FIG. 5 schematically shows a refractive index profile of a core of an optical fiber in Embodiment 2 and a doping amount of F in the core.
Figure 6:
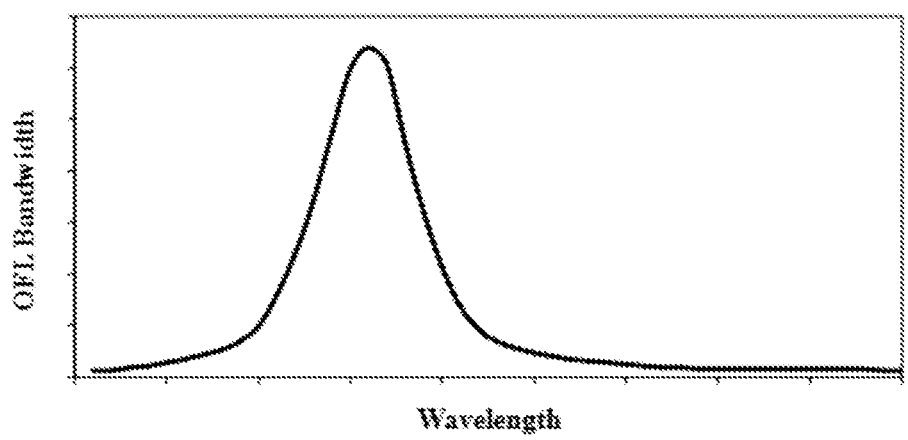
FIG. 6 schematically shows a relation between bandwidth of the optical fiber in Embodiment 2 and wavelength thereof.

The optical fiber comprises a core and a cladding. A refractive index profile of the core has a parabola shape and a distribution index a thereof is 2.06. The core has a radius R1 of 24.8 μm, and a maximum relative refractive index difference $\Delta 1_{max}$ of a central position of the core is 1.12%. The core is a Ge—F co-doped silicon dioxide glass layer. A mass percentage of F content of the core distributed along the radius conforms to a following function:

$$C_F(r) = C_{F,min} + C_F' \times \frac{r}{R1} \times \left(k - \frac{r}{R1}\right),$$

wherein $C_{F,min}$ is 0, $C_F'$ is $5\times 10^{-3}$, and k is 2.3. The cladding successively comprises an inner cladding, a trench cladding, and an outer cladding from inside to outside. The inner cladding has a radius R2 of 28.8 μm and a relative refractive index difference Δ2 of 0.01%. The trench cladding has a radius R3 of 34.6 μm and a relative refractive index difference Δ3 of −0.42%. The outer cladding is a pure silicon dioxide glass layer and has a radius of 125 μm. Measurement results of structure and properties of the obtained optical fiber are shown in Table 1. FIG. 5 schematically shows a refractive index profile of the optical fiber and a doping amount of F in the core. The doping amount of F increases from the center of the core of the optical fiber to the edge thereof. The doping amount of F has a minimum value at the center of the core and a maximum value at the edge of the core. FIG. 6 schematically shows a relation between bandwidth of the optical fiber and wavelength thereof.

Embodiment 3

A multimode optical fiber manufactured according to the technical solution of the present disclosure.

Figure 7:
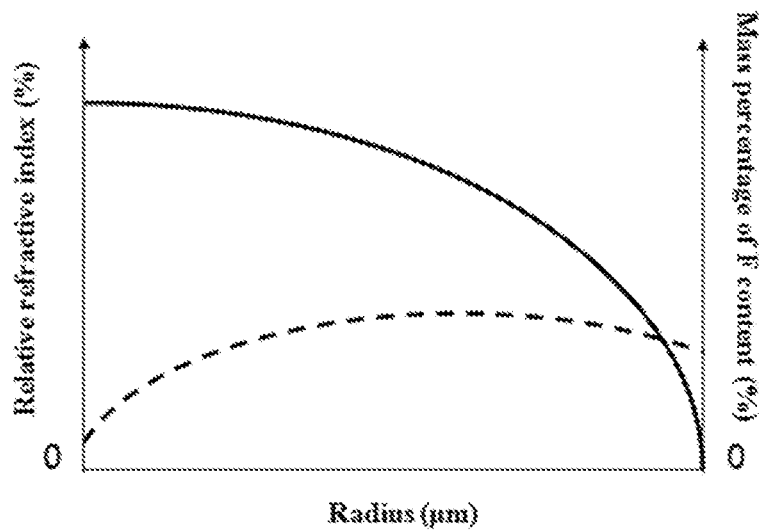
FIG. 7 schematically shows a refractive index profile of a core of an optical fiber in Embodiment 3 and a doping amount of F in the core.
Figure 8:
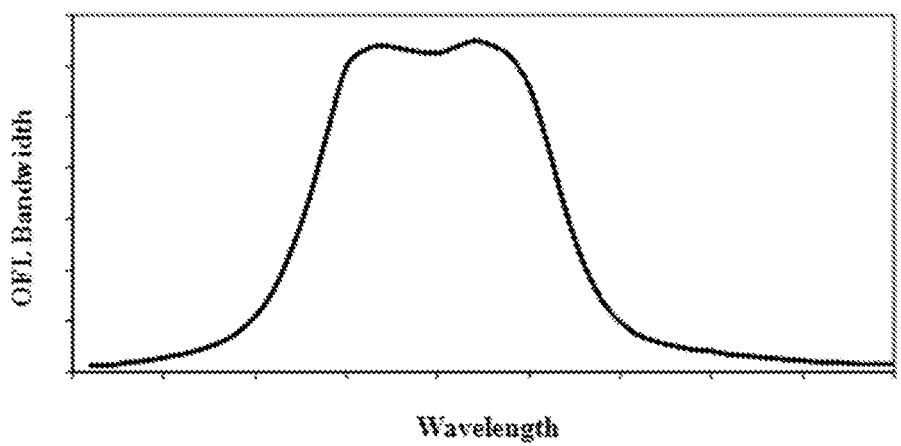
FIG. 8 schematically shows a relation between bandwidth of the optical fiber in Embodiment 3 and wavelength thereof.

The optical fiber comprises a core and a cladding. A refractive index profile of the core has a parabola shape and a distribution index α thereof is 2.09. The core has a radius R1 of 25.5 μm, and a maximum relative refractive index difference $\Delta 1_{max}$ of a central position of the core is 1.09%. The core is a Ge—F co-doped silicon dioxide glass layer. A mass percentage of F content of the core distributed along the radius conforms to a following function:

$$C_F(r) = C_{F,min} + C_F' \times \frac{r}{R1} \times \left(k - \frac{r}{R1}\right),$$

wherein $C_{F,min}$ is $0.4\times 10^{-3}$, $C_F'$ is $8\times 10^{-3}$, and k is 1.8. The cladding successively comprises an inner cladding, a trench cladding, and an outer cladding from inside to outside. The inner cladding has a radius R2 of 30.1 μm and a relative refractive index difference Δ2 of −0.03%. The trench cladding has a radius R3 of 36.2 μm and a relative refractive index difference Δ3 of −0.6%. The outer cladding is a pure silicon dioxide glass layer and has a radius of 125 μm. Measurement results of structure and properties of the obtained optical fiber are shown in Table 1. FIG. 7 schematically shows a refractive index profile of the optical fiber and a doping amount of F in the core. The doping amount of F first increases and then decreases from the center of the core of the optical fiber to the edge thereof. The doping amount of F has a minimum value at the center of the core, reaches a maximum value at a certain area inside the core, and then decreases at the edge of the core. FIG. 8 schematically shows a relation between bandwidth of the optical fiber and wavelength thereof.

TABLE 1

Parameters of Structures and Main Properties of Optical Fibers

|  |  | Embodiment 1 | Embodiment 2 | Embodiment 3 |
|---|---|---|---|---|
| Parameters of Optical Fiber Structure | Core α | 2.01 | 2.06 | 2.09 |
|  | $C_{F, min}$ | — | 0 | $0.4 \times 10^{-3}$ |
|  | $C_F$ | — | $5 \times 10^{-3}$ | $8 \times 10^{-3}$ |
|  | k | — | 2.3 | 1.8 |
|  | $\Delta 1_{max}$ (%) | 0.98 | 1.12 | 1.09 |
|  | Δ2 (%) | −0.02 | 0.01 | −0.03 |
|  | Δ3 (%) | −0.55 | −0.42 | −0.6 |
|  | R1 (μm) | 25.3 | 24.8 | 25.5 |
|  | R2 (μm) | 29.7 | 28.8 | 30.1 |
|  | R3 (μm) | 35.9 | 34.6 | 36.2 |
| Parameters of Optical Fiber Properties | Numerical Aperture | 0.196 | 0.208 | 0.203 |
|  | DMD Inner Mask @850 nm (ps/m) | 0.11 | 0.05 | 0.09 |
|  | DMD Outer Mask @850 nm (ps/m) | 0.12 | 0.07 | 0.1 |
|  | DMD Interval Mask @850 nm (ps/m) | 0.09 | 0.04 | 0.07 |
|  | OFL Bandwidth @850 nm (MHz-km) | 4240 | 9863 | 6253 |
|  | OFL Bandwidth @950 nm (MHz-km) | 1837 | 2750 | 3426 |
|  | OFL Bandwidth @1300 nm (MHz-km) | 546 | 588 | 619 |
|  | Effective-Mode Bandwidth @850 nm (MHz-km) | 4534 | 11642 | 7015 |
|  | Effective-Mode Bandwidth @875 nm (MHz-km) | 3490 | 6741 | 5029 |
|  | Effective-Mode Bandwidth @900 nm (MHz-km) | 2913 | 4322 | 5477 |
|  | Effective-Mode Bandwidth @925 nm (MHz-km) | 2307 | 3697 | 6108 |
|  | Effective-Mode Bandwidth @950 nm (MHz-km) | 1959 | 2975 | 3960 |
|  | Macro-Bending Additional Loss Caused by 2 Circles of Bending With a Bending Radius of 7.5 mm @850 nm (dB) | 0.08 | 0.15 | 0.02 |
|  | Macro-Bending Additional Loss Caused by 2 circles of Bending With a Bending Radius of 7.5 mm @1300 nm (dB) | 0.23 | 0.36 | 0.11 |

It is shown by the experiments that, regarding multimode optical fibers with an α profile, the peak position of a bandwidth-wavelength curve can be changed by changing the value of α. However, the peak shape does not change much. In other words, the bandwidth-wavelength sensitivity of the optical fiber will not be obviously changed by adjusting the α value of the optical fiber.

However, the shape of the bandwidth-wavelength curve of the optical fiber can be changed by adjusting the F doping amount in a doping system of the core of the optical fiber. For example, the effects of adjusting the bandwidth-wavelength sensitivity of the optical fiber can be realized by changing the doping amount of F in the core or changing the distribution of the doping amount of F in the core along the core radius. By way of broadening peak width of the bandwidth-wavelength curve of the optical fiber, the high bandwidth performance of the optical fiber can be extended to a wider wavelength range, so as to be adapted to the requirement for application of the WDM technology.

In order to manufacture multimode optical fibers with high bandwidth performance, graded-index distribution of the core needs to be precisely controlled. The optical fiber of the present disclosure has special requirements for the doping amount of F in the core. In-tube deposition methods such as plasma chemical vapor deposition (PCVD) and modified chemical vapor deposition (MCVD) can better realize precise control of the refractive index distribution of the core and the doping amount of F in the core. The in-tube deposition method refers to chemical vapor deposition on the inner wall of a liner tube. In this method, reaction gas comes in from one end of the liner tube, and when a heat source moves from the gas inlet end to the other end, a thin glass layer is formed on the inner wall of the liner tube. By reciprocating movements of the heat source along the axial direction of the liner tube, layer-by-layer deposition of thin glass layers is realized. By controlling the reaction gas inflow amount of each layer, precise control of the refractive index profile and the doping amount can be realized. Finally, an optical fiber preform is formed. Then the preform is placed on an optical fiber wire-drawing tower to be wire-drawn as an optical fiber.

What is claimed is:

1. A high-bandwidth bend-insensitive multimode optical fiber, comprising a core and a cladding, wherein:
   a refractive index profile of the core has a parabola shape and a distribution index thereof is α;
   the core has a radius R1 of 23 to 27 μm, a maximum relative refractive index difference $\Delta 1_{max}$ of a central position of the core is 0.9% to 1.2%, and the core is a germanium-fluorine co-doped silicon dioxide glass layer;

the central position of the core has a minimum amount of fluorine doped with a mass percentage of fluorine content being $C_{F,min}$, and the mass percentage of the fluorine content of the core changes with a radial position r from the central position of the core according to a following function:

$$C_F(r) = C_{F,min} + C'_F \times \frac{r}{R1} \times \left(k - \frac{r}{R1}\right),$$

wherein k is a constant in a range from 1 to 2.5, $C'_F$ is in a range from $3\times10^{-3}$ to $12\times10^{-3}$, and the radial position r varies from the central position r=0 to an edge r=R1 of the core, and the mass percentage $C_{F,min}$ of the fluorine content of the central position of the core is in a range from $0.4\times10^{-3}$ to $1\times10^{-3}$, and the distribution index α of the refractive index profile of the core is in a range from 1.9 to 2.2; and the cladding successively comprises an inner cladding, a trench cladding, and an outer cladding from inside to outside.

2. The high-bandwidth bend-insensitive multimode optical fiber according to claim 1, wherein the inner cladding has a single side width (R2−R1) of 3.0 to 6.0 μm and a relative refractive index difference Δ2 of −0.05% to 0.05%;

the trench cladding has a single side width (R3−R2) of 5.0 to 8.0 μm and a relative refractive index difference Δ3 of −1.0% to −0.4%; and the outer cladding is a pure silicon dioxide glass layer.

3. The high-bandwidth bend-insensitive multimode optical fiber according to claim 1, wherein DMD of the optical fiber at a wavelength of 850 nm meets following standards:

DMD Inner Mask (5 to 18 μm) and DMD Outer Mask (0 to 23 μm) are both smaller than or equal to 0.14 ps/m; and DMD Interval Mask is smaller than or equal to 0.11 ps/m.

4. The high-bandwidth bend-insensitive multimode optical fiber according to claim 1, wherein the optical fiber has a numerical aperture of 0.185 to 0.215.

5. The high-bandwidth bend-insensitive multimode optical fiber according to claim 1, wherein the optical fiber has a bandwidth equal to or larger than 3500 MHz-km at a wavelength of 850 nm, has a bandwidth equal to or larger than 2300 MHz-km at a wavelength of 950 nm, and has a bandwidth equal to or larger than 500 MHz-km at a wavelength of 1300 nm.

6. The high-bandwidth bend-insensitive multimode optical fiber according to claim 1, wherein the optical fiber has an effective-mode bandwidth equal to or larger than 4700 MHz-km at a wavelength of 850 nm, and has an effective-mode bandwidth equal to or larger than 3400 MHz-km at a wavelength of 875 nm.

7. The high-bandwidth bend-insensitive multimode optical fiber according to claim 6, wherein the optical fiber has an effective-mode bandwidth equal to or larger than 2900 MHz-km at a wavelength of 900 nm, has an effective-mode bandwidth equal to or larger than 2800 MHz-km at a wavelength of 925 nm, and has an effective-mode bandwidth equal to or larger than 2500 MHz-km at a wavelength of 950 nm.

8. The high-bandwidth bend-insensitive multimode optical fiber according to claim 1, wherein:

when the optical fiber bends 2 circles with a bending radius of 7.5 mm at a wavelength of 850 nm, an additional bending loss caused thereby is smaller than 0.2 dB; and when the optical fiber bends 2 circles with a bending radius of 7.5 mm at a wavelength of 1300 nm, an additional bending loss caused thereby is smaller than 0.5 dB.

* * * * *